United States Patent Office
3,239,516
Patented Mar. 8, 1966

3,239,516
DITHIOCARBOXYLATED CEPHALOSPORINS
Earle M. Van Heyningen and Carter N. Brown, both of Indianapolis, Ind., assignors to Eli Lilly and Company, Indianapolis, Ind., a corporation of Indiana
No Drawing. Filed Jan. 18, 1965, Ser. No. 426,392
15 Claims. (Cl. 260—243)

This invention relates to novel organic compounds and to methods for their preparation and use.

The novel compounds of the present invention are antibiotic substances having the characteristic ring structure of cephalosporin C but having a piperazinodithiocarboxylate-derived moiety in the 3 position instead of the acetoxymethyl group of cephalosporin C. The novel compounds are of the class represented by the following formulas:

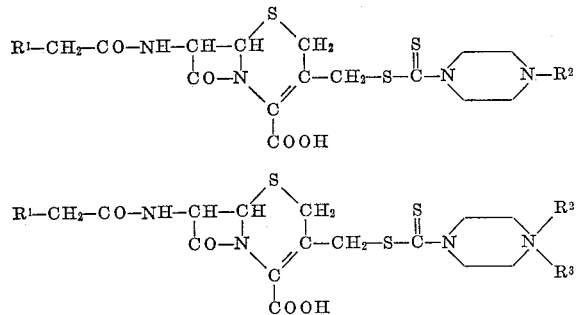

in which $R^1$ is hydrogen, $C_1$–$C_7$ alkyl, $C_1$–$C_7$ alkoxy, $C_1$–$C_7$ alkylmercapto, phenyl, phenoxy, phenylmercapto, thienyl, furyl, benzothienyl, or benzofuryl;
$R^2$ is $C_1$–$C_6$ alkyl, $C_2$–$C_6$ alkenyl, or carboxyl;
$R^3$ is $C_1$–$C_6$ alkyl; and
$R^2$ and $R^3$ contain a total of not more than eight carbon atoms.

The novel compounds are readily obtained as the betaines (zwitterionic forms), or as salts with pharmaceutically acceptable cations, or as the $C_1$–$C_6$ alkyl esters of the 4-carboxyl group, and it is to be understood that such forms thereof are included within the scope of the invention.

As used herein, "alkyl" refers broadly to primary, secondary, and tertiary alkyl, of both straight-chain and branched-chain configuration, wherein the number of carbon atoms therein is within the designated range, including methyl, ethyl, n-propyl, isopropyl, n-butyl, isobutyl, sec.-butyl, tert.-butyl, n-amyl, isoamyl, 2-amyl, 3-amyl, neopentyl, n-hexyl, isohexyl, 2-hexyl, and (where within the range) n-heptyl, isoheptyl, 3-heptyl, 2-methylhexyl, and the like.

"Alkenyl" refers broadly to primary, secondary, and tertiary alkenyl, of both straight-chain and branched-chain configuration, including vinyl, 1-propenyl, allyl, isopropenyl, crotyl, 3-butenyl, 1-isobutenyl, 2-isobutenyl, tert.-butenyl, 4-pentenyl, 2-isopentenyl, 5-hexenyl, neohexenyl, and the like.

"Alkoxy" refers to alkyl-O- groups wherein the alkyl moiety is as defined above.

"Alkylmercapto" refers to alkyl-S- groups wherein the alkyl moiety is as defined above.

Thienyl, benzothienyl, furyl, and benzofuryl groups may be attached at either the α or β position.

"Pharmaceutically acceptable cations" refers to the positive ionic forms of sodium, potassium, lithium, calcium, barium, magnesium, aluminum, and other metals of acceptably low toxicity level, as well as the metalloid ammonium and a variety of organic nitrogen bases, including methylammonium, dimethylammonium, trimethylammonium, tetramethylammonium, choline, the ethylammoniums, procaine, quinine, dibenzylethylenediamine, and the like.

"Halo," as used hereinafter, refers to fluoro, chloro, bromo, or iodo.

In naming the novel compounds of the invention, it is convenient to designate the characteristic saturated fused-ring β-lactam thiazine structure of the cephalosporins as "cepham,"

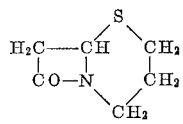

and to name the compounds as derivatives thereof, the term "cephem" referring to the basic ring structure with a single olefinic bond. According to this system, cephalosporin C itself would be named 7-(5′-aminoadipamido)-3-acetoxymethyl-3-cephem-4-carboxylic acid. More informally, it is convenient to name the compounds as derivatives of a hypothetical compound, 7-amino-3-cephem-4-carboxylic acid, and to specify the differences therefrom by naming the radical attached to the

CO—NH— group in the 7 position and the piperazinodithiocarboxylate which is employed to replace the acetoxy group in the 3 position. Thus 7 - α - thienylacetamido-3-(4′-methylpiperazinothiocarbonylthiomethyl) - 3 - cephem-4-carboxylic acid is more simply designated as "α-thienylmethyl 4 - methylpiperazinodithiocarboxylate cephalosporin."

Illustrative of the compounds lying within the scope of the present invention are the following examples, which may exist either in zwitterionic form or as salts with non-toxic pharmaceutically acceptable cations:

7-β-furylacetamido-3-(4′-(5″-hexenyl)piperazinothiocarbonylthiomethyl)-3-cephem-4-carboxylic acid
7-n-butylmercaptoacetamido-3-(4′-ethylpiperazinothiocarbonylthiomethyl)-3-cephem-4-carboxylic acid
7-β-benzothienylacetamido-3-(4′-tert.-butylpiperazinothiocarbonylthiomethyl)-3-cephem-4-carboxylic acid
7-phenylacetamido-3-(4′-ethylpiperazinothiocarbonylthiomethyl)-3-cephem-4-carboxylic acid
7-neopentylcarboxamido-3-(4′-(2″-hexenyl)piperazinothiocarbonylthiomethyl)-3-cephem-4-carboxylic acid
7-n-nonanoamido-3-(4′-allylpiperazinothiocarbonylthiomethyl)-3-cephem-4-carboxylic acid
7-isovaleramido-3-(4′-n-hexylpiperazinothiocarbonylthiomethyl)-3-cephem-4-carboxylic acid
7-n-hexyloxyacetamido-3-(4′-(2″-isobutenyl)piperazinothiocarbonylthiomethyl)-3-cephem-4-carboxylic acid
7-phenoxyacetamido-3-(4′-sec.-butylpiperazinothiocarbonylthiomethyl)-3-cephem-4-carboxylic acid
7-isocaproamido-3-(4′-neopentylpiperazinothiocarbonylthiomethyl)-3-cephem-4-carboxylic acid
7-phenylmercaptoacetamido-3-(4′-methylpiperazinothiocarbonylthiomethyl)-3-cephem-4-carboxylic acid
7-propionamido-3-(4′-crotylpiperazinothiocarbonylthiomethyl)-3-cephem-4-carboxylic acid
7-β-thienylacetamido-3-(4′-n-butylpiperazinothiocarbonylthiomethyl)-3-cephem-4-carboxylic acid 7-ethylmercaptoacetamido-3-(4'-isoamylpiperazinothio-
carbonylthiomethyl)-3-cephem-4-carboxylic acid
7-n-butyramido-3-(4'-isobutylpiperazinothiocarbonyl-
thiomethyl)-3-cephem-4-carboxylic acid
7-α-thienylacetamido-3-(4'-isopropylpiperazinothiocar-
bonylthiomethyl-3-cephem-4-carboxylic acid
7-α-benzofurylacetamido-3-(4'-vinylpiperazinothiocar-
bonylthiomethyl)-3-cephem-4-carboxylic acid
7-acetamido-3-(4'-amylpiperazinothiocarbonylthio-
methyl)-3-cephem-4-carboxylic acid
7-methoxyacetamido-3-(4'-methyl-4'-ethylpiperazino-
thiocarbonylthiomethyl)-3-cephem-4-carboxylic acid
7-α-benzothienylacetamido-3-(4',4'-diethylpiperazino-
thiocarbonylthiomethyl)-3-cephem-4-carboxylic acid
7-ethoxyacetamido-3-(4'-ethyl-4'-n-hexylpiperazinothio-
carbonylthiomethyl)-3-cephem-4-carboxylic acid
7-α-furylacetamido-3-(4'-ethyl-4'-vinylpiperazinothio-
carbonylthiomethyl)-3-cephem-4-carboxylic acid
7-caprylamido-3-(4'-ethyl-4'-n-butylpiperazinothiocar-
bonylthiomethyl)-3-cephem-4-carboxylic acid
7-valeramido-3-(4',4'-di-n-butylpiperazinothiocarbonyl-
thiomethyl)-3-cephem-4-carboxylic acid
7-methylmercaptoacetamido-3-(4',4'-dimethylpiperazino-
thiocarbonylthiomethyl)-3-cephem-4-carboxylic acid While the compounds of the present invention have been defined in terms of a structural formula which depicts the novel structural features of the claimed compounds and which indicates the presence therein of certain well-known organic radicals, including alkyl, alkenyl, phenyl, thienyl, benzothienyl, furyl, benzofuryl, and piperazino, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are halo, hydroxy, nitro, lower alkyl, trifluoromethyl, methoxy, methylmercapto, cyano, hydroxymethyl, β-hydroxyethyl, acetyl, actamido, and the like.

The compounds of the present invention are readily prepared from an appropriate derivative of 7-aminocephalosporanic acid (i.e., a derivative thereof having the desired acylamido group in the 7 position and the characteristic acetoxymethyl group in the 3 position) by displacement of the acetoxyl group with a piperazino-dithiocarboxylate of appropriate structure. The reaction is conveniently carried out by dissolving a salt of the 7-aminocephalosporanic acid compound in water, adding an aqueous solution of an alkali-metal salt of the piperazinodithiocarboxylate, preferably in at least a small molar excess, and stirring and warming at ordinary or somewhat elevated temperature for several hours. The pH of the piperazinodithiocarboxylate solution should not exceed about 7.5-8, and may be adjusted downward, if it exceeds this level, with hydrochloric acid, sulfuric acid, or the like. The reaction may be carried out at temperatures between about 25 and about 100° C., preferably around 40 to 60° C., and for periods of about one to about 24 hours or more, the time necessary for complete reaction varying inversely with the temperature, and extended reaction times being without adverse effect under the preferred temperature conditions. The products thus obtained are water-insoluble in many cases, and may conveniently be filtered off and recrystallized from chloroform-ether. When water-soluble, they may be salted out as a yellow glass by adding sodium chloride to about 50 percent of saturation, with which conditions the starting materials and by-products remain largely in solution. The yellow glass is readily purified by dissolving in chloroform, washing with 50 percent-saturated aqueous sodium chloride solution to remove impurities, diluting with ether, and crystallizing.

As an alternative method, 7-aminocephalosporanic acid can be reacted with the piperazinodithiocarboxylate, and the resulting intermediate can be reacted with an appropriate acylating agent to introduce the desired substituent in the 7 position.

The 4',4'-disubstituted piperazinothiocarbonylthiomethyl products are obtained by first preparing the 4'-monosubstituted piperazinothiocarbonylthiomethyl cephalosporin compound and alkylating with a highly reactive alkyl or alkenyl halide such as methyl bromide, allyl bromide, or methyl iodide under known conditions. For this purpose, the alkyl iodides are effective, as well as the alkenyl chlorides, bromides, and iodides.

The desired cephalosporin C starting material, having the acetoxymethyl group in the 3 position, is readily prepared by means now well-known in the art. The most convenient and economical method involves acylating 7-aminocephalosporanic acid with an acylating agent having the desired structure under conventional conditions. A convenient acylating agent is, for example, the appropriate $R^1$-substituted acetyl chloride or bromide. The acylation is carried out in water or in an appropriate organic solvent, preferably under substantially neutral conditions and preferably at reduced temperature, i.e., above the freezing point of the reaction mixture and up to about 20° C. In a typical procedure, 7-aminocephalosporanic acid is commingled with aqueous 50 volume-percent acetone and a sufficient quantity of sodium bis-carbonate to promote solution, the concentration of 7-aminocephalosporanic acid being about one to about four percent by weight. The solution is cooled to around 0 to 5° C., and a solution of the acylating agent is added in about 20 percent excess, with stirring and cooling. The mixture is then allowed to warm to room temperature, after which it is acidified to around pH 2 and extracted with ethyl acetate or other immiscible organic solvent. The ethyl acetate extract is adjusted to around pH 4.5 with potassium hydroxide or other base and is back-extracted into water. The water solution is separated and evaporated to dryness. The residue is taken up in the minimum quantity of water, and the acylated product is precipitated by adding a large excess of acetone and, if necessary, ether. The crystalline material obtained thereby is filtered, washed with acetone, and dried.

The piperazinodithiocarboxylates employed in the present invention are conveniently prepared by the method of Bögemann, Methoden der Organischen Chemie (Houben-Weyl), Stuttgart: Georg Thiems Verlag, 1955, volume 9, page 826. A solution of sodium hydroxide (0.2 mole) in 35 ml. of water is cooled to 0° C. and mixed with an appropriately N-substituted piperazine (0.2 mole). Then carbon disulfide (0.2 mole) is added dropwise and the mixture is stirred for one hour. In some cases, the desired piperazinodithiocarboxylate precipitates as the sodium salt from the reaction mixture, while in other cases it remains in solution. In all cases, it is desirable to add several volumes of acetone to effect or complete the precipitation of the product. The solid is filtered off and air-dried, and is conveniently recrystallized from ethyl acetate or from aqueous acetone. The products are obtained in yields ranging from 60 to 80 percent of theory. This technique is readily applicable to the preparation of the alkali-metal salts of 4-methyl, 4-ethyl, 4-isopropyl, 4-n-propyl, 4-isobutyl, 4-n-butyl, 4-(2-butyl), 4-n-amyl, 4-neopentyl, 4-n-hexyl, and the other piperazinodithiocarboxylates employed in the present invention, as well as the analogous 4-alkenyl compounds within the contemplation of the present disclosure. The results of typical preparations of the sodium salts are given in the following table, where the substituent at the 4 position of the piperazine ring is referred to as "$R^2$."

| R² | Melting Point [a], °C. | Yield, percent | Analyses | | | | | |
|---|---|---|---|---|---|---|---|---|
| | | | C | | H | | N | |
| | | | Calc. | Found | Calc. | Found | Calc. | Found |
| Methyl | >290 | 45.5 | 36.34 | 36.43 | 5.59 | 5.62 | 14.13 | 13.78 |
| Ethyl | 232–235 | 76 | 37.98 | 38.32 | 6.37 | 6.20 | 12.65 | 12.02 |
| n-Propyl | 265–268 | 80 | 42.45 | 42.28 | 6.68 | 6.84 | 12.38 | 12.35 |
| Isopropyl | 262–266 | 61.7 | 40.82 | 40.92 | 6.85 | 6.64 | 11.90 | 11.57 |
| n-Butyl | 248–250 | 63 | 44.97 | 44.82 | 7.12 | 7.14 | 11.65 | 11.60 |
| n-Amyl | 254–258 | 85 | 47.21 | 47.34 | 7.52 | 7.75 | 11.01 | 10.80 |

[a] All compounds melted with decomposition.

The invention will be more readily understood from the following operating examples, which are submitted as illustrations only, and not by way of limitation.

In all cases, the following procedure was employed with only slight variations to prepare the designated compound. A 0.0012 mole portion of the appropriately substituted sodium 7-acylamidocephalosporanate and an equimolar amount of the appropriate sodium piperazinodithiocarboxylate were dissolved in 10 ml. of water and heated at 40–45° C. in a thermostated oil bath for 24 hours, then filtered to remove a small quantity of insoluble byproduct. The desired product was precipitated as a yellow glass by addition of an equal volume of aqueous saturated sodium chloride solution and chilling for several hours. The supernatant solution was decanted from the solid phase and the solid was dissolved in 25 to 50 ml. of chloroform. The chloroform solution was washed about 10 times with successive 12–15 ml. portions of 50 percent saturated aqueous sodium chloride solution. In some cases, especially toward the end of the wash, troublesome emulsions were formed, but were readily broken by centrifuging. The washing was conveniently followed by qualitative ultraviolet spectra of the wash solutions; disappearance of the spectrum for starting material and appearance of the spectrum for the product indicated when washing was complete. The washed chloroform solution was evaporated to half volume or less, then diluted with ether, and chilled. The sodium salt of the desired product separated as a fine powder, which was centrifuged and dried under vacuum.

The melting points of the products were not sharp, owing to the fact that the compounds tend to decompose at or around their melting point, and the melting points therefore vary, depending upon the temperature of the melting-point block when the compounds were first applied. All of the products, however, had infrared spectra consistent with the expected structure and gave one spot against *Bacillus subtilis* in bio-autographs of paper chromatograms, which were developed with methyl ethyl ketone saturated with water. These data, together with the ultraviolet spectra, titrations, and analyses, were sufficient to characterize the substances fully.

EXAMPLE 1

α-*Thienylmethyl 4-methylpiperazinodithiocarboxylate cephalosporin*

7-α-thienylacetamido-3-(4'-methylpiperazinothiocarbonylthiomethyl)-3-cephem-4-carboxylic acid sodium salt was obtained from 7-α-thienylacetamidocephalosporanic acid and 4-methylpiperazinodithiocarboxylate. Yield, 23.5 percent of theory. $pK'_a$, 4.6 and 6.1. Ultraviolet absorption maximum at 272 m$\mu$ ($\epsilon=21{,}600$).

*Analysis.*—Calc.: C 44.92, H 4.33, N 10.48. Found: C 44.77, H 4.50, N 10.28.

EXAMPLE 2

α-*Thienylmethyl 4-ethylpiperazinodithiocarboxylate cephalosporin*

7 - α-thienylacetamido-3-(4'-ethylpiperazinothiocarbonylthiomethyl)-3-cephem-4-carboxylic acid sodium salt was obtained from 7-α-thienylacetamido cephalosporanic acid and 4-ethylpiperazinodithiocarboxylate. Yield, 6.1 percent of theory. Ultraviolet absorption maxima at 242 and 270 m$\mu$ ($\epsilon=16{,}550$ and $19{,}500$, respectively).

*Analysis.*—Calc.: C 45.97, H 4.59, N 10.21. Found: C 46.06, H 4.65, N 10.18.

EXAMPLE 3

α-*Thienylmethyl 4-n-propylpiperazinodithiocarboxylate cephalosporin*

7 - α-thienylacetamido-3-(4'-n-propylpiperazinothiocarbonylthiomethyl)-3-cephem-4-carboxylic acid sodium salt was obtained from 7-α-thienylacetamidocephalosporanic acid and 4-n-propylpiperazinodithiocarboxylate. Yield, 25.2 percent of theory. $pK'_a$, 4.4 and 6.2. Ultraviolet absorption maximum at 270 m$\mu$ ($\epsilon=22{,}200$).

*Analysis.*—Calc.: C 46.95, H 4.83, N 9.96. Found: C 47.09, H 4.79, N 9.91.

EXAMPLE 4

α-*Thienylmethyl 4-isopropylpiperazinodithiocarboxylate cephalosporin*

7 -α-thienylacetamido-3-(4'-isopropylpiperazinothiocarbonylthiomethyl)-3-cephem-4-carboxylic acid sodium salt was obtained from 7-α-thienylacetamidocephalosporanic acid and 4-isopropylpiperazinodithiocarboxylate. Yield, 13.3 percent of theory. $pK'_a$, 4.5 and 6.5. Ultraviolet absorption maxima at 240 and 270 m$\mu$ ($\epsilon=18{,}200$ and $20{,}600$, respectively).

*Analysis.*—Calc.: C 46.95, H 4.83, N 9.96. Found: C 46.90, H 4.99, N 9.55.

EXAMPLE 5

α-*Thienylmethyl 4-n-butylpiperazinodithiocarboxylate cephalosporin*

7 - α - thienylacetamido-3-(4'-n-butylpiperazinothiocarbonylthiomethyl)-3-cephem-4-carboxylic acid sodium salt was obtained from 7-α-thienylacetamidocephalosporanic acid and 4-n-butylpiperazinodithiocarboxylate. Yield, 23.2 percent of theory. $pK'_a$, 4.5 and 6.25. Ultraviolet absorption maximum at 271 m$\mu$ ($\epsilon=21{,}600$).

*Analysis.*—Calc.: C 47.89, H 5.06, N 9.71. Found: C 47.61, H 5.25, N 9.48.

EXAMPLE 6

α-*Thienylmethyl 4-n-amylpiperazinodithiocarboxylate cephalosporin*

7 - α - thienylacetamido-3-(4'-n-amylpiperazinothiocarbonylthiomethyl)-3-cephem-4-carboxylic acid sodium salt was obtained from 7-α-thienylacetamidocephalosporanic acid and 4-n-amylpiperazinodithiocarboxylate. Yield, 14.2 percent of theory. $pK'_a$, 4.4 and 6.2. Ultraviolet absorption maximum at 270 m$\mu$ ($\epsilon=19{,}700$).

*Analysis.*—Calc.: C 47.41, H 5.42, N 9.20. Found: C 47.06, H 5.36, N 9.12.

EXAMPLE 7

*α-Thienylmethyl 4-(β-hydroxyethyl)piperazinodithiocarboxylate cephalosporin*

7 - α - thienylacetamido - 3-(4'-(β-hydroxyethyl)piperazinothiocarbonylthiomethyl)-3-cephem-4-carboxylic acid sodium salt was obtained from 7-α-thienylacetamidocephalosporanic acid and 4-(β-hydroxyethyl)piperazinodithiocarboxylate. The chloroform-insoluble crude product was precipitated as the zwitterionic compound at pH 5.5. The solid was filtered off, washed with water, and redissolved with aqueous 1 N sodium hydroxide at pH 7.2. The solution was evaporated to dryness under vacuum, and the residue was recrystallized from methanol-isopropanol. Yield, 9.6 percent of theory. $pK'_a$, 4.4 and 5.8. Ultraviolet absorption maxima at 235 and 270 m$\mu$ ($\epsilon$=16,500 and 20,500, respectively).

*Analysis.*—Calc.: C 44.66, H 4.46, N 9.92. Found: C 44.88, H 4.40, N 9.98.

EXAMPLE 8

*α-Thienylmethyl 2-carboxy-4-methylpiperazinodithiocarboxylate cephalosporin*

7 - α - thienylacetamido-3-(2'-carboxy-4'-methylpiperazinothiocarbonylthiomethyl)-3-cephem-4-carboxylic acid disodium salt was obtained from 7-α-thienylacetamidocephalosporanic acid and 2-carboxy-4-methylpiperazinodithiocarboxylate. The latter was used in the form of the crude disodium salt. The reaction was carried out by acidifying the aqueous reaction mixture to pH 8 and heating at 70° C. for 2 hours. When nothing precipitated on addition of saturated sodium chloride solution, the diacid was precipitated at pH 2. The solid was filtered off and redissolved in dilute sodium hydroxide at pH 6.5. The solution was evaporated to dryness under vacuum, and the residue was recrystallized from methanol-isopropanol. Yield, 6.6 percent of theory. $pK'_a$, 4.7 and 6.85. Ultraviolet absorption maxima at 234 and 272 m$\mu$ ($\epsilon$=15,400 and 17,300, respectively).

*Analysis.*—Calc.: C 39.62, H 4.09, N 8.80. Found: C 39.70, H 4.11, N 8.25.

EXAMPLE 9

*Phenylmercaptomethyl 4-methylpiperazinodithiocarboxylate cephalosporin*

7 - phenylmercaptoacetamido - 3-(4'-methylpiperazinothiocarbonylthiomethyl)-3-cephem-4-carboxylic acid sodium salt was obtained from 7-phenylmercaptoacetamidocephalosporanic acid and 4-methylpiperazinodithiocarboxylate. Yield, 18.9 percent of theory. $pK'_a$, 4.5 and 6.05. Ultraviolet absorption maximum at 256 m$\mu$ ($\epsilon$=17,390).

*Analysis.*—Calc.: C 47.12, H 4.49, N 9.99. Found: C 48.80, H 4.80, N 9.04.

EXAMPLE 10

*α-Thienylmethyl 4-carbethoxypiperazinodithiocarboxylate cephalosporin*

7 - α-thienylacetamido-3-(4'-carbethoxypiperazinothiocarbonylthiomethyl)-3-cephem-4-carboxylic acid sodium salt was obtained from 7-α-thienylacetamidocephalosporanic acid and 4-carbethoxypiperazinodithiocarboxylate. Yield, 45.3 percent of theory. $pK'_a$, 4.98. Ultraviolet absorption maximum at 273 m$\mu$ ($\epsilon$=24,400).

*Analysis.*—Calc.: C 44.58, H 4.25, N 9.45. Found: C 44.38, H 4.41, N 9.49.

The quaternary piperazinium compounds of the following examples were prepared in the following way. The 4-alkylpiperazinodithiocarboxylate derivative of the cephalosporin was prepared as described in the foregoing examples, except that the chloroform solution was washed only twice with the sodium chloride solution, and was then evaporated and the residue dried. The crude sodium salt thus obtained (about 0.01 mole) was dissolved in 100 ml. of dry chloroform and commingled with a solution of 0.0105 mole of the appropriate alkyl or alkenyl halide in 10 ml. of chloroform. The mixture was held in a stoppered flask at room temperature with occasional shaking for 4–7 days, during which time there was a gradual precipitation of solid. The cream-colored precipitate was filtered and air-dried, then triturated with water to remove co-precipitated sodium iodide. The product, which was a yellow taffy quite insoluble in water, was dissolved in dimethylformamide (25–35 ml./g.) by warming gently and adding water cautiously until the cloudiness cleared. Then tetrahydrofuran (5–10 volumes) was added, and the turbid mixture was cooled. The resulting precipitate was separated by centrifuging, washed with ether, and vacuum-dried.

EXAMPLE 11

*α-Thienylmethyl 4,4-dimethylpiperazinodithiocarboxylate cephalosporin*

7 - α - thienylacetamido - 3 - (4',4' - dimethylpiperazinothiocarbonylthiomethyl) - 3 - cephem - 4 - carboxylic acid betaine was obtained from 7-α-thienylacetamido-3-(4' - methylpiperazinothiocarbonylthiomethyl) - 3 - cephem-4-carboxylic acid and methyl iodide. The product betaine, unlike the other 4',4' quaternaries, was insoluble in dimethylformamide. It was therefore triturated in warm dimethylformamide, filtered, and washed with water, then with ether, and dried. Yield, 48.0 percent of theory. $pK'_a$, 4.58. Ultraviolet absorption maximum at 269 m$\mu$ ($\epsilon$=20,400).

*Analysis.*—Calc.: C 47.88, H 4.97, N 10.64. Found: C 47.79, H 5.42, N 10.43.

EXAMPLE 12

*α-Thienylmethyl 4-methyl-4-n-propylpiperazinodithiocarboxylate cephalosporin*

7 α - thienylacetamido - 3 - (4' - methyl - 4' - n - propylpiperazinothiocarbonylthiomethyl) - 3 - cephem - 4-carboxylic acid betaine was obtained from 7-α-thienylacetamido - 3 - (4' - n - propylpiperazinothiocarbonylthiomethyl)-3-cephem-4-carboxylic acid and methyl iodide. Yield, 26.4 percent of theory. $pK'_a$, 4.6. Ultraviolet absorption maximum at 273 m$\mu$ ($\epsilon$=23,000).

*Analysis.*—Calc.: C 49.79, H 5.45, N 10.10. Found: C 49.67, H 5.55, N 9.82.

EXAMPLE 13

*α-Thienylmethyl 4-methyl-4-allylpiperazinodithiocarboxylate cephalosporin*

7 - α - thienylacetamido - 3 - (4' - methyl - 4' - allylpiperazinothiocarbonylthiomethyl) - 3 - cephem - 4 - carboxylic acid betaine was obtained from 7-α-thienylacetamido - 3 - (4' - methylpiperazinothiocarbonylthiomethyl)-3-cephem-4-carboxylic acid and allyl bromide. Yield, 66.3 percent of theory. $pK'_a$, 4.6. Ultraviolet absorption maximum at 271 m$\mu$ ($\epsilon$=21,650).

*Analysis.*—Calc.: C 49.97, H 5.10, N 10.14 Found C 49.72, H 5.21, N 9.96.

EXAMPLE 14

*α-Thienylmethyl 4-methyl-4-n-butylpiperazinodithiocarboxylate cephalosporin*

7 - α - thienylacetamido - 3 - (4' - methyl - 4' - n - butylpiperazinothiocarbonylthiomethyl ) - 3 - cephem - 4 - carboxylic acid betaine was obtained from 7-α-thienylacetamido - 3 - (4' - n - butylpiperazinothiocarbonylthiomethyl)-3-cephem-4-carboxylic acid and methyl iodide. Yield, 25 percent of theory. $pK'_a$, 4.6. Ultraviolet absorption maximum at 271 m$\mu$ ($\epsilon$=22,900).

*Analysis.*—Calc.: C 50.67, H 5.67, N 9.85. Found: C 50.56, H 5.64, N 9.89.

The compounds of the present invention are characized by resistance to the destructive action of penicillinase, and by a high degree of activity against a broad range of both Gram-positive and Gram-negative pathogens.

We claim:
1. A compound selected from the group consisting of:

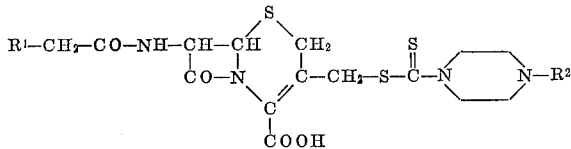

and

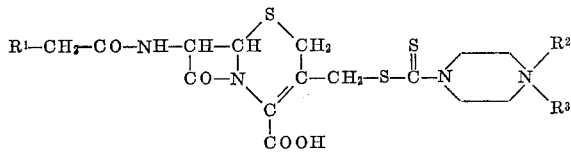

wherein $R^1$ is a member of the group consisting of hydrogen, $C_1$–$C_7$ alkyl, $C_1$–$C_7$ alkoxy, $C_1$–$C_7$ alkylmercapto, phenyl, phenoxy, phenylmercapto, thienyl, furyl, benzothienyl, and benzofuryl;

$R^2$ is a member of the group consisting of $C_1$–$C_6$ alkyl, $C_2$–$C_6$ alkenyl, and carboxyl;

$R^3$ is $C_1$–$C_6$ alkyl; and $R^2$ and $R^3$ contain a total of not more than eight carbon atoms;

and the salts of said compounds with pharmaceutically acceptable cations, and the $C_1$–$C_6$ alkyl esters of the 4-carboxyl group.

2. 7 - α - thienylacetamido - 3 - (4′ - methylpiperazinothiocarbonylthiomethyl)-3-cephem-4-carboxylic acid.

3. 7 - α - thienylacetamido - 3 - (4′ - ethylpiperazinothiocarbonylthiomethyl)-3-cephem-4-carboxylic acid.

4. 7 - α - thienylacetamido - 3 - (4′ - n - propylpiperazinothiocarbonylthiomethyl)-3-cephem-4-carboxylic acid.

5. 7 - α - thienylacetamido - 3 - (4′ - isopropylpiperazinothiocarbonylthiomethyl)-3-cephem-4-carboxylic acid.

6. 7 - α - thienylacetamido - 3 - (4′ - n - butylpiperazinothiocarbonylthiomethyl)-3-cephem-4-carboxylic acid.

7. 7 - α - thienylacetamido - 3 - (4′ - n - amylpiperazinothiocarbonylthiomethyl)-3-cephem-4-carboxylic acid.

8. 7 - α - thienylacetamido - 3 - (4′ - (β - hydroxyethyl)piperazinothiocarbonylthiomethyl) - 3 - cephem-4-carboxylic acid.

9. 7 - α - thienylacetamido - 3 - (2′ - carboxy - 4′-methylpiperazinothiocarbonylthiomethyl) 3 - cephem - 4-carboxylic acid.

10. 7 - phenylmercaptoacetamido - 3 - (4′ - methylpiperazinothiocarbonylthiomethyl) - 3 - cephem - 4 - carboxylic acid.

11. 7 - α - thienylacetamido - 3 - (4′ - carbethoxypiperazinothiocarbonylthiomethyl) - 3 - cephem - 4 - carboxylic acid.

12. 7 - α - thienylacetamido - 3 - (4′,4′ - dimethylpiperazinothiocarbonylthiomethyl) - 3 - cephem - 4 - carboxylic acid.

13. 7 - α - thienylacetamido - 3 - (4′ - methyl - 4′ - n-propylpiperazinothiocarbonylthiomethyl) - 3 - cephem-4-carboxylic acid.

14. 7 - α - thienylacetamido - 3 - (4′ - methyl - 4′ - allylpiperazinothiocarbonylthiomethyl) - 3 - cephem - 4-carboxylic acid.

15. 7 - α - thienylacetamido - 3 - (4′ - methyl - 4′ - n-butylpiperazinothiocarbonylthiomethyl) - 3 - cephem - 4-carboxylic acid.

No references cited.

IRVING MARCUS, *Primary Examiner.*